United States Patent [19]

Gugel et al.

[11] Patent Number: 5,431,043
[45] Date of Patent: Jul. 11, 1995

[54] CATALYST ACTIVITY TEST

[75] Inventors: Jonathan K. Gugel, Troy; Robert W. Vandenbush, Wixom; Paul F. Ghanam, Sterling Heights, all of Mich.

[73] Assignee: General Motors Corporation, Detroit, Mich.

[21] Appl. No.: 236,837

[22] Filed: May 2, 1994

[51] Int. Cl.6 .................................................. G01L 3/26
[52] U.S. Cl. ..................... 73/117.3; 73/23.31
[58] Field of Search .................... 73/116, 117.3, 117, 73/23.31, 23.32

[56] References Cited

U.S. PATENT DOCUMENTS

| | | | |
|---|---|---|---|
| 4,116,053 | 9/1978 | Blanke | 73/117.3 |
| 4,164,142 | 8/1979 | Blanke | 73/117.3 |
| 4,372,155 | 2/1983 | Butler et al. | 73/23.32 |
| 5,265,693 | 11/1993 | Rees et al. | 180/197 |

FOREIGN PATENT DOCUMENTS

| | | | |
|---|---|---|---|
| 0492165 | 6/1992 | European Pat. Off. | 73/23.31 |
| 4128997 | 3/1993 | Germany | 73/23.31 |
| 3073839 | 3/1991 | Japan | 73/23.31 |

OTHER PUBLICATIONS

"Field Testing of Catalytic Converters" Catalytic Converters the Theory of Operation and Functional Diagnosis Manual, Aug., 1992, pp. 72–91.

"Idle Mixture Adjustment" 1978 Product Information Supplement, Nov. 1977, pp. 1–8.

*Primary Examiner*—Richard E. Chilcot, Jr.
*Assistant Examiner*—James M. Olsen
*Attorney, Agent, or Firm*—Karl F. Barr, Jr.

[57] ABSTRACT

A method for testing the catalyst activity of a catalytic converter installed in the exhaust system of an internal combustion engine involves running the engine to heat the converter to a normal operating temperature. Once the converter has reached a desired temperature the engine is shut off and the fuel and ignition systems of the engine are disabled and a source of hydrocarbon is introduced at a location upstream of the converter such as the air induction system. Upon introduction of the hydrocarbons, the engine is cranked to thereby pump the hydrocarbon through the system where it is mixed with air and to the converter where the mixture is subject to conversion. The exhausted constituents are analyzed and the activity of the converter is determined based on the levels thereof.

5 Claims, 2 Drawing Sheets

CATALYST ACTIVITY TEST

TECHNICAL FIELD

This invention relates to the testing of automotive catalytic converters and, in particular, to an apparatus and method for on-vehicle identification of an inactive or degraded catalytic converter.

BACKGROUND

Advancement in emission technology for internal combustion engines has resulted in significant reductions in total vehicle emissions. In general, automotive emissions applications employ an exhaust mounted catalytic converter for reducing regulated exhaust constituents such as Hydrocarbons (HC), Carbon Monoxide (CO), and Oxides of Nitrogen ($NO_2$). Ideally, the catalyst alters the rate of the converting, chemical reaction without itself being consumed or changed by that reaction. In reality, catalysts applied in automotive emission controls may change in use, and may become inactive or seriously degraded, requiring replacement. Since catalyst degradation is not predictable solely on mileage accumulation or determinable by external observation, a means by which the operation of the converter may be assessed, without undue intrusion or disassembly of the vehicle exhaust system, has been sought.

In one converter test method, tailpipe exhaust emissions levels are compared to engine-out exhaust emissions levels. Reductions in measured emissions between engine-out and tailpipe are attributed to catalyst activity. This method is intrusive in that it requires access to the exhaust flow upstream of the converter requiring a tap or a hole be introduced into the exhaust system establishing the potential for leakage.

A second method indirectly assesses catalytic activity by comparing the temperature of the exhaust gas entering the converter to that of the exiting exhaust gas. Catalyst activity within the converter should generate additional heat (approximately 200° F.) during the conversion process which would be absent in the presence of a degraded catalyst. This method requires catalyst hydrocarbon loading sufficient to produce a temperature differential which is measurable and, as a result, has the potential for damaging the catalyst.

Another method indirectly assesses converter activity by measuring the efficiency of the chemical reaction taking place within the converter, which determines residual oxygen and the quantity of carbon monoxide produced in the unit. The method uses external control to vary the engine air/fuel mixture to obtain maximum exhaust $CO_2$. Such external control may involve propane enrichment to establish stoichiometric operation in the converter during engine operation which is required for proper catalyst efficiency. Such a test requires that the engine and exhaust system be operating properly prior to testing. Fueling or ignition errors by the engine or air leaks in the exhaust system will give inaccurate readings resulting in replacement of a properly functioning catalytic converter.

The current tests for field determination of catalyst activity each suffer from the disclosed disadvantages. A primary disadvantage is the inability to isolate testing of the converter from the operation of the engine to thereby avoid failures of properly functioning converters caused by an improperly functioning engine or exhaust system.

INTRODUCTION

The present invention is directed to a non-intrusive, on-vehicle method for assessing catalytic converter function. The invention allows the converter to be tested independently of the vehicle engine and, as a result, provides results which are not affected by engine malfunction. In addition, the present invention, unlike known converter tests, allows individual testing of converters in dual converter/single exhaust systems.

An internal combustion engine having a catalytic converter integral with its exhaust system is operated for a period of time sufficient to assure that the converter is at normal operating temperature. Engine fuel and ignition are disabled and the engine is cycled, using the starter, while a metered quantity of a hydrocarbon fuel such as propane is introduced into the intake of the engine. Air from the intake mixes with the propane and the air/propane mixture is pumped into the hot catalyst where the conversion process oxidizes the propane. Tailpipe Hydrocarbon (HC), Oxygen ($O_2$), or Carbon Dioxide ($CO_2$) emissions, measured by a gas analyzer, indicate conversion efficiency.

These and other features, objects, and advantages of the invention will be more apparent by reference to the following description and to the drawings.

DESCRIPTION OF THE PREFERRED EMBODIMENTS

Figure 1:
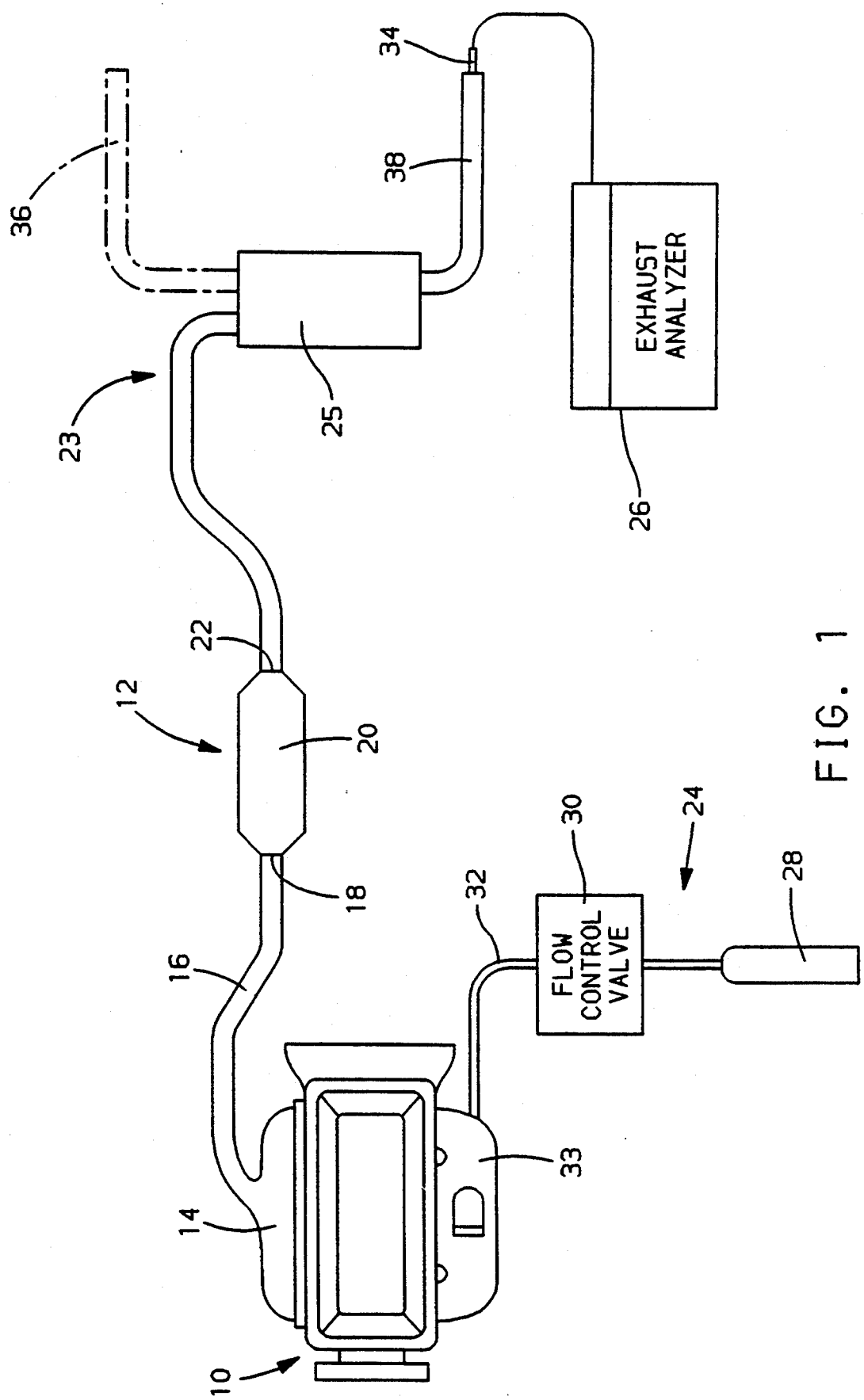
FIG. 1 is a schematic view of an engine and exhaust system having the testing apparatus useful with the method of the present invention installed thereon.

FIG. 1 illustrates an internal combustion engine 10 and its associated exhaust system, designated generally as 12, for automotive application. The exhaust system conducts exhaust gasses from the exhaust ports of the engine 10 via an exhaust manifold 14 and conduit 16. The conduit 16 terminates at the inlet 18 of catalytic converter 20. Exhaust gasses are converted within the converter 20 and exit the unit through outlet 22 and tailpipe assembly 23 which includes muffler 25.

The method for testing the catalyst activity of the converter 20 involves the use of a hydrocarbon enrichment apparatus 24 and an exhaust gas analyzer 26. In the preferred embodiment illustrated in the figures, the hydrocarbon of choice is propane gas which is chosen for its high hydrocarbon content, availability, consistency and ease of use. The propane enrichment apparatus includes a propane source such as cylinder 28, a metering valve 30, and a propane supply conduit 32 which is adapted for attachment to the engine. The exhaust gas analyzer 26, including tailpipe probe 34, is operable to sample the gasses exiting the tailpipe and determine levels of various constituents such as Hydrocarbon (HC), Oxygen ($O_2$) or Carbon Dioxide ($CO_2$).

Catalyst activity testing must be done on a hot catalytic converter. More particularly, the converter must have reached its catalyst "light-off" temperature which is that temperature at which the catalyst becomes sufficiently active to alter the rate of the chemical reaction in the converter. The engine 10 is operated for a sufficient period of time to allow converter light-off and is turned off.

Following engine shut off, the fuel and ignition systems of engine 10, are disabled. By disabling these systems, the engine can still be cycled or cranked using the starter motor but the engine cylinders will not receive fuel or a combustion initiating spark which would interfere with the test results. The engine may, at this time, be cycled for a short period of time to clear the engine cylinders and the exhaust system 12, upstream of converter 20, of any residual fuel or exhaust gasses. Following the engine purge, the hydrocarbon enrichment apparatus 24 is connected to the engine 10 via propane supply conduit 32 and the exhaust gas analyzer 26 is connected to the exhaust system 12 via probe 34. The attachment location of the propane supply conduit 32 of the enrichment apparatus 24 may be any location which is upstream of, and operably connected with, the converter. As illustrated in FIG. 1, a likely location for attachment is a manifold vacuum source associated with intake manifold 33 such as the PCV valve, the power brake booster vacuum hose, or the like. It should be apparent that attachment of the various test components and disabling of the engine fuel and ignition sources must be accomplished in an expedient manner to prevent cooling of the converter below its operable temperature prior to running the test. As is illustrated in phantom in FIG. 1, in vehicles having an additional tailpipe 36 which is fed from a single exhaust conduit, the additional outlet must be blocked to assure full exhaust flow to the analyzer probe 34.

A metered quantity of propane is supplied to the engine and, simultaneously, the engine is cycled using the starter. The effect of the above actions is to utilize the engine 10 as a pump to move hydrocarbons and air, entering the engine through the intake and mixing with the propane during the cycling, to the converter 20. The quantity of propane injected into the engine is based on the known displacement, and therefore volume, of the engine and the cycling rate to thereby deliver an air/propane mixture to the converter which is appropriate for conversion. As the air/propane mixture passes through the preheated converter, a catalytic reaction takes place therein and a known quantity of combustion constituents should exit the unit based on the known air/propane input if the unit is functioning properly. The combustion constituents are monitored by the exhaust gas analyzer 26 through probe 34 in the tailpipe 38. A properly functional converter will convert hydrocarbons (in this case, propane) and oxygen from the cranking engine into carbon dioxide and other constituents. The analyzer may be set to monitor residual HC emissions or $O_2$ and $CO_2$ emissions in order to determine the catalyst activity present in the converter.

Figure 2:
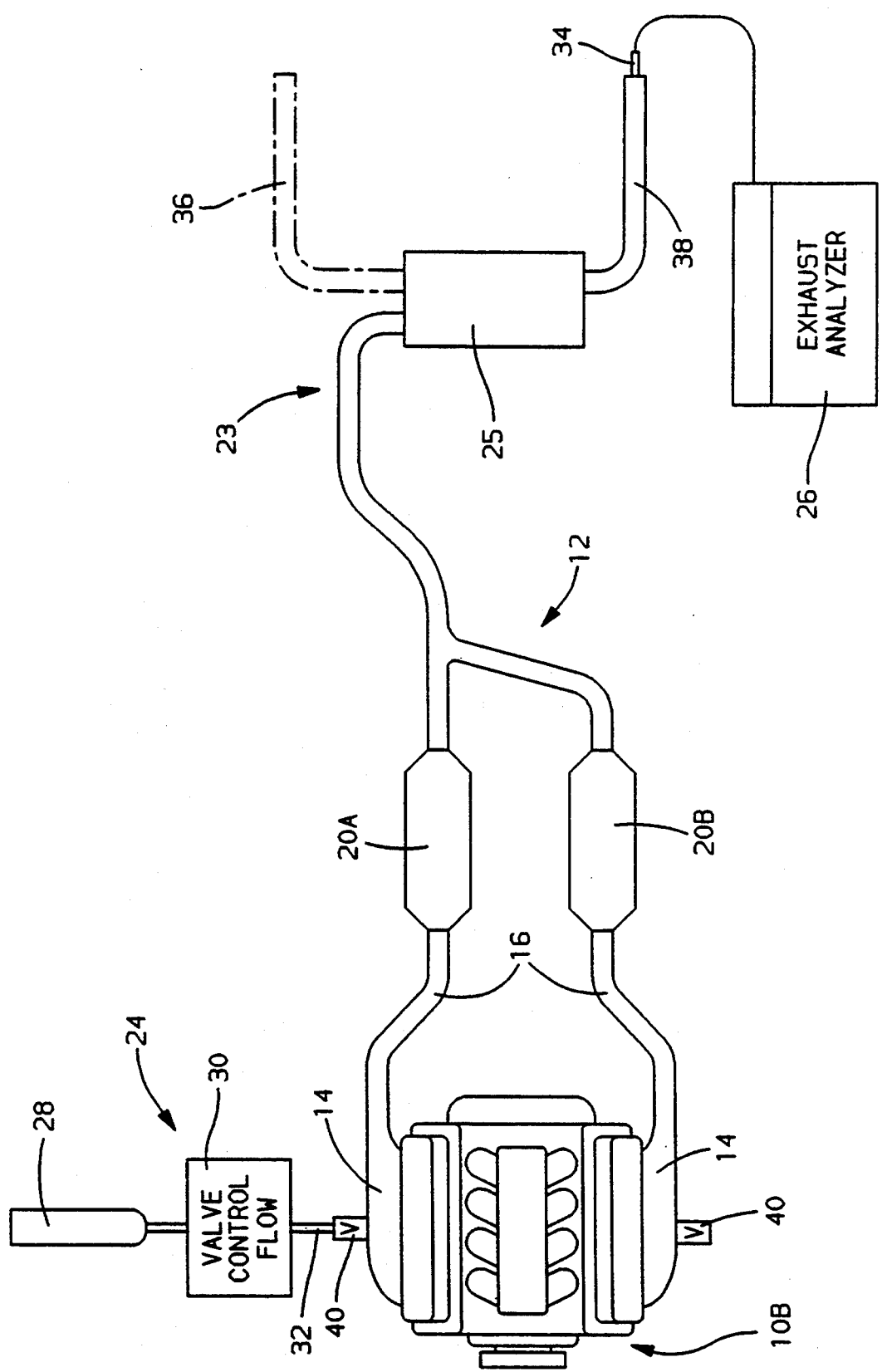
FIG. 2 is a schematic view of a second engine and exhaust system configuration having the testing apparatus of FIG. 1 installed thereon.

FIG. 2 illustrates a second embodiment of an engine and exhaust system in which items shown in FIG. 1 and described above have like numerals. In applications involving multiple cataleptic converters 20A,20B, such as with larger displacement v-configured engines 10B, it is possible to test each converter using the method of the present invention by separately injecting the propane gas into a location upstream of each individual converter. Such injection locations may include Auxiliary Air Check Valves 40 located in the exhaust manifolds 14. As in the above discussion, a hot converter/engine is cycled while injecting a metered quantity of hydrocarbon such as propane upstream of one of the converters 20A or 20B in the system. Exhaust constituents are collected and analyzed by probe 34 of analyzer 26 downstream of the converter to determine proper functioning. The procedure is repeated for the second converter. It should be noted that known testing procedures which require engine operation during the test do not allow for the testing of individual converters in a multiple converter system since the engine banks and their associated converters can not be isolated as in the present case where hydrocarbon fueling can be limited to only one converter at a time.

The converter test method described thus far utilizes an external source for the introduction and metering of hydrocarbons to the engine/exhaust system of an automobile. An important advantage in using an external source such as the hydrocarbon enrichment apparatus 24 is the removal, from the test procedure, of any engine or fuel introduced variabilities which might lead to an incorrect assessment of converter operation. It is, however, contemplated that an external source of hydrocarbon may be dispensed with in some instances. As an alternative method for testing the activity of a catalytic converter in a system such as is shown in FIG. 1, the engine 10 is operated, as described above, until the converter 20 reaches a temperature at which light-off should occur in a properly functioning converter. Once converter operating temperature is reached, the engine is shut off and the ignition system is disabled. If the fuel system of the engine is functioning properly, it may be used as the source of a metered quantity of hydrocarbons for the converter activity test. For instance, one or more injectors in a fuel injected engine, may be used to meter fuel through the engine 10 and into the hot catalytic converter 20 for testing. The metered hydrocarbon is subjected to catalyst activity within the converter 20 and the levels of exhaust constituents are assessed using the exhaust analyzer 26. Such an alternative method for testing vehicle mounted converters is applicable to dual converter arrangements on v-configured engines such as that shown in FIG. 2 if the fuel injectors to the various engine banks can be selectively disabled allowing hydrocarbon fuel to be introduced to a single converter 20A or 20B at a time.

The present invention discloses a direct, non-intrusive method of catalyst assessment for use in determining catalytic converter function on an internal combustion engine. The invention which provides for accurate testing of catalyst activity is applicable to an automotive application and may be administered without removal of the converter from the vehicle.

The present invention utilizes the internal combustion engine, and the exhaust conduit between the engine and the converter, as an air pump and mixing chamber to push a metered quantity of air and hydrocarbon fuel through a preheated catalyst where catalyst reaction occurs. The exhaust constituents generated by the reaction in the converter are monitored at the tailpipe and provide an accurate indication of converter operation.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiment may be modified in light of the above teachings. The embodiment described was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows.

We claim:

1. A method for testing the catalyst activity in a catalytic converter associated with an internal combustion engine, said engine having an ignition system, and intake and exhaust systems, said catalytic converter operably associated with said exhaust system, said method comprising the steps of preheating the catalytic converter, disabling the ignition system of the engine, introducing a metered quantity of hydrocarbons into the engine upstream of the catalytic converter, cycling the engine such that said metered quantity of hydrocarbon will be pumped, through the action of the cycling engine, through the preheated catalytic converter and, analyzing exhaust flow out of the converter and determining the level of exhaust constituents therein and the level of catalyst activity in said converter.

2. A method for testing the catalyst activity in a catalytic converter associated with an internal combustion engine, said engine having a fuel system, an ignition system, and intake and exhaust systems, said catalytic converter operably associated with said exhaust system, said method comprising the steps of preheating the catalytic converter, disabling the fuel and ignition systems of the engine, introducing a metered quantity of hydrocarbons from a source into the engine upstream of the catalytic converter and simultaneously cycling the engine such that said metered quantity of hydrocarbon will be pumped, through the action of the cycling engine, through the preheated catalytic converter and, analyzing exhaust flow out of the converter and determining the level of exhaust constituents therein and the level of catalyst activity in said converter.

3. A method for testing the catalyst activity in a catalytic converter associated with an internal combustion engine, said engine having a fuel system, an ignition system, and intake and exhaust systems, said catalytic converter operably associated with said exhaust system, said method comprising the steps of preheating the catalytic converter to a temperature at which catalyst activity readily occurs in a functioning converter, disabling the fuel and ignition systems of the engine, introducing a metered quantity of hydrocarbons from a source into the engine upstream of the catalytic converter and cycling the engine such that said metered quantity of hydrocarbon is mixed with air from said intake and is pumped, by the action of the cycling engine, through the preheated catalytic converter and, analyzing exhaust flow out of the converter and determining the level of exhaust constituents therein and the level of catalyst activity in said converter.

4. A method for the catalyst activity in a catalytic converter, as defined in claim 3, wherein said hydrocarbon introduced into said engine is propane gas.

5. A method for the catalyst activity in a catalytic converter, as defined in claim 3, wherein said analysis of exhaust flow includes the steps of analyzing for hydrocarbons, oxygen, and carbon dioxide levels.

* * * * *